United States Patent Office 3,373,143
Patented Mar. 12, 1968

3,373,143
MANUFACTURE OF POLYURETHANE
SOLUTIONS
Kenneth William Chilvers, Gordon Trappe, and Gerald Patrick Crowley, Manchester, England, assignors to Imperial Chemical Industries Limited, London, England, a corporation of Great Britain
No Drawing. Filed May 24, 1963, Ser. No. 282,875
Claims priority, application Great Britain, May 30, 1962, 20,856/62
5 Claims. (Cl. 260—75)

ABSTRACT OF THE DISCLOSURE

A process for obtaining solutions of polyurethanes in organic solvents, suitable for preparing elastomeric films, coatings, and adhesives, by interaction in an inert solvent of a hydroxyl-terminated compound and excess diisocyanate in presence of a controlled small quantity of water, and thereafter adding isocyanate reactive compounds to remove residual free isocyanate groups.

This invention relate to an improved process for the manufacture of solutions of polyurethanes.

Polyurethane elastomers, obtained from polymeric hydroxyl-terminated compounds such as polyesters and polyester-amides by reaction with approximately equivalent amounts of diisocyanates, may be dissolved in organic solvents such as esters, ketones or aromatic hydrocarbons. The process of dissolving the polyurethane is however not attractive since a prolonged time of mixing in heavy duty equipment is usually required. Furthermore the properties, in particular viscosity, of the solutions obtained are critically dependent upon the degree of chain extension in the preparation of the polyurethane elastomer and the reproducible preparation of these solutions requires a degree of control in the manufacture of the polyurethane which it is difficult to exercise. Attempts to prepare the polyurethanes in solution by interaction of the polymeric hydroxyl-terminated compounds and diisocyanates in a solvent have hitherto led to solutions of low viscosity which have little practical utility.

We have now found that solutions of polyurethanes in organic solvents, suitable for use in the manufacture of elastomeric films, coatings and adhesives, may be obtained by interaction in an inert organic solvent of a hydroxyl-terminated compound and excess diisocyanate in presence of a controlled small quantity of water. Under these conditions solutions of suitably high viscosity can be obtained which can be stabilized against further viscosity increase by removal of residual free isocyanate groups by the addition of isocyanate-reactive compounds.

According to our invention therefore there is provided a process for the manufacture of a solution in an inert organic solvent of a polyurethane which comprises the steps of (1) interacting in said solution, 1 molar proportion of a hydroxyl-terminated polyester or polyesteramide, between 1.2 and 2.5 molar proportions of an organic diisocyanate and between 0.25 and 1.0 molar proportions of water and, when the viscosity of the solution is between 1 and 1500 poises measured at 25° C. (2) adding an isocyanate-reactive compound in molar amount at least substantially equal to the molar amount of isocyanate groups unreacted at the end of step (1).

As organic solvent there may be mentioned any organic solvent which is inert towards isocyanate and hydroxyl groups, preferred solvents being esters, ketones, aromatic hydrocarbons, and chlorohydrocarbons. The amount of solvent should be sufficient to give solutions containing from 10 to 80% of polyurethane.

The hydroxyl-terminated polyester or polyesteramide used in the process of our invention should be essentially linear and prepared by conventional methods from for example dicarboxylic acids, glycols and, as necessary, minor proportions of diamines or aminoalcohols. Suitable dicarboxylic acids include succinic, glutaric, adipic, suberic, azelaic, sebacic, phthalic, isophthalic and terephthalic acids and mixtures of these. Examples of dihydric alcohols include ethylene glycol, 1:2-propyleneglycol, 1:3-butylene glycol, 2:3-butyleneglycol, diethylene glycol, tetramethylene glycol, pentamethylene glycol, hexamethylene glycol, decamethylene glycol and 2:2-dimethyltrimethyleneglycol. Suitable diamines or aminoalcohols include hexamethylene diamine, ethylene diamine, monoethanolamine, phenylenediamines and benzidine. Mixtures of polyesters and polyesteramides may be used if desired. Small proportions of polyhydric alcohols such as glycerol or trimethylolpropane may also be used, but large amounts of such compounds lead to undesirable solvent-insolubility. The polyesters and polyesteramides should preferably have acid value less than 5 mg. KOH/g. and a molceular weight between 800 and 5000, and preferably between 1000 and 2700.

Especially valuable polyurethane solutions are obtained if polyesteramides containing one amido group for each 1500 to 12,000 units of molecular weight are used. The preferred quantities of diisocyanate and water for reaciton with one mol. of such a polyesteramide are between 1.3 and 1.6 mol. of diisocyanate and between 0.3 and 0.6 mol. of water.

Examples of suitable organic diisocyanates include aliphatic diisocyanates such as hexamethylene diisocyanate, aromatic diisocyanates such as tolylene-2:4-diisocyanate, tolylene-2:6-diisocyanate, diphenylmethane-4:4'-diisocyanate, 3-methyldiphenylmethane-4:4'-diisocyanate, m- and p-phenylenediisocyanate, chlorophenylene - 2:4 - diisocynate, naphthylene-1:5-diisocyanate, naphthylene-1:4-diisocyanate, diphenyl-4:4'-diisocyanate, 4:4'-diisocyanate-3:3'-dimethyldiphenyl, diphenylether diisocyanates, and cycloaliphatic diisocyanates such as dicyclohexylmethane diisocyanate, and methylcyclohexyldiisocyanate, and mixtures of these diisocyanates.

As an isocyanate-reactive compound there may be mentioned for example any compound containing hydroxyl, or primary or secondary amino groups. The isocyanate-reactive compound may be monofunctional, as for example an alcohol such as methanol, phenol, or primary or secondary monoamine, or polyfunctional as for example ethylene glycol, diethylene glycol, 2:3-butylene glycol, tetramethylene glycol, trimethylolpropone, ethylene diamine, hexamethylene diamine, N:N'-disubstituted ethylene diamines, phenylene diamines, tolylenediamines, and diaminodiphenylmethane. Water also functions as a difuctional isocyanate-reactive compound in the process of the invention. It is preferred to use polyfunctional isocyanate-reactive compounds since they lead to surface-coatings and adhesives of improved properties. Of the organic polyfunctional isocyanate-reactive compounds, it is preferred to use compounds in which the reactive groups are not all of the same reactivity towards the isocyanate group as for example in 1:2-propyleneglycol, glycerol, 1:3-butylene glycol, ethanolamine and diethanolamine since these compounds give a better control of the viscosity.

The amount of isocyanate-reactive compound needed will depend upon the amount of unreacted isocyanate groups which will vary with the polyesters or polyesteramides and diisocyanates used and amounts of these and also the extent to which it is necessary to carry out reaction in order to achieve the required viscosity. The amount of unreacted isocyanate groups can be determined by conventional methods and the necessary minimum usage of isocyanate-reactive compound then calculated on the basis of a molar amount for each molar amount of free isocyanate groups, i.e. so that for each isocyanate group there is one molecule of isocyanate-reactive compound. However this procedure is frequently inconvenient and it has been found in general entirely satisfactory to add an amount of isocyanate-reactive compound such that there is a molar amount of such compound for each molar amount of diisocyanate in excess of that required to react with the polyester or polyesteramide alone. This will normally involve the use of an excess of isocyanate-reactive compound but this does not interfere with the process of the invention and is not necessarily a disadvantage in the application of the products of the invention in the preparation of for example surface-coatings or adhesives, although it may make the use of additional polyisocyanate desirable at the curing stage. In the case however where the isocyanate-reactive compound contains primary or secondary amino groups it is desirable to deactivate any excess for example by treatment with a reactive ester such as diethyl carbonate as the primary or secondary amino groups may cause some degradation of the polyester part of the polyurethane.

Use of less than the molar quantity of isocyanate-reactive compound may lead to difficulty in the control of viscosity and result in polyurethane solutions of decreased storage stability although such solutions, when freshly prepared, afford satisfactory surface coatings or adhesives.

Step (1) of the process of the invention may be carried out at any temperature between 40 and 130° C. but temperatures between 60 and 100° are preferred. It may however be desirable to reduce the temperature to below these ranges near the end of the reaction in order to facilitate control of the reaction.

We have also found that the polymerisation may be accelerated by catalysts of the types used in reactions between isocyanates and compounds containing active hydrogen, such as organic and inorganic basic compounds, and soluble organic compounds of metals, for example of transition metals, such as iron and manganese acetyl acetonate, and of tin and antimony, for example dibutyl tin dilaurate and stannous octoate, compounds of lead such as lead acetate, basic lead acetate and lead 2-ethylhexoate. As basic organic catalyst tertiary amines are suitable, particularly 4-dimethylaminopyridine, triethylenediamine, dimethylbenzylamine, and dimethylcyclohexylamine.

Step (2) of the process of the invention may be carried out at any temperature, from room temperature to a temperature of 130° C.

When catalysts have been used in step (1) subsequent deactivation with for example an acidic compound is desirable, since such catalysts if left in the reaction mixture may give rise to shortened storage life or pot life at the application stage. Examples of suitable acidic compounds include organic acids, such as adipic acid, salicylic acid and inorganic acids such as phosphoric acid or hydrochloric acid.

The solutions prepared by the process of our invention are of especial value in the manufacture of flexible coatings and adhesives. Substrates for these include textiles of natural, artificial or synthetic materials, rubber, paper, wood, leather, metals, glass, plastics such as polyvinyl chloride and polyurethane materials such as flexible and rigid foams.

Such solutions are particularly advantageous when used as adhesives in the lamination of plastic sheet material to a substrate. Examples of such substrates are knitted, woven or felted materials, flexible and rigid foams made from polyvinyl chloride or polyurethane. Hitherto, the lamination of plastic materials to such substrates has been found difficult to achieve. Using an adhesive solution according to our invention, a permanent bond may be made between these materials by conventional laminating techniques.

For application to these substrates the solutions are mixed with organic polyisocyanates which may contain two or more isocyanate groups, applied to the substrates by any conventional method, and the coatings so obtained are cured at any temperature between room temperature and 180° C. Organic polyisocyanates which may be used for curing include those known from the prior art to be useful for the preparation of polyurethanes, for example those diisocyanates mentioned above as suitable for the preparation of the polyurethane solution. Polyisocyanates containing more than two isocyanate groups per molecule may however be used. Examples of such polyisocyanates include the reaction products of an excess of diisocyanate with trihydric alcohols or mixtures of dihydric and trihydric alcohols, isocyanate group-containing isocyanurate polymers of diisocyanates and polyisocyanates, as well as aromatic triisocyanates such as 2:4:4'-triisocyanatodiphenylether and 2:4:6-triisocyanatotoluene. The proportion of polyisocyanate used for curing is desirably from about 8% to 25% by weight of the solids content of the polyurethane solution, but amounts outside this range may be used if desired, especially if an excess of isocyanate-reactive compound is used for stabilisation. When diisocyanates or polyisocyanates are used curing temperatures preferably should be between room temperature and 100° C. Isocyanate generators, such as adducts of polyisocyanates with phenols may also be used in which case curing temperatures between 70° C. and 180° C. are necessary.

The polyurethane solutions may also be converted, preferably after the addition of further polyisocyanate, into elastomeric filaments by conventional wet or dry spinning methods. The inert organic solvent may for example be removed by spinning into a solvent which is miscible with the inert organic solvent but is not a solvent for the prepolymer or by passing a stream of hot gas such as air over the filament after spinning.

The invention is illustrated but not limited by the following examples in which all parts and percentages are by weight unless otherwise stated.

*Example 1*

27.6 parts of an 80/20 mixture of 2:4- and 2:6-tolylene diisocyanate and 0.6 part of water are added to 500 parts by volume of a solution in methylethyl ketone of 200 parts by weight of a polyesteramide, and the mixture is heated at 80° C. precautions being taken to ensure no contact with atmosphereic moisture. The viscosity of the solution rises slowly and after 42 hours, when it has reached about 200 poises at 25° C. the solution is cooled and a solution of 2.1 parts by weight of methanol in 7 parts of methylehtyl ketone is added with stirring. The solution so obtained is suitable for the preparation of surface coatings as described in Example 3.

The polyesteramide used in this example is prepared by heating a mixture of 176 parts of ethylene glycol, 17.1 parts of diethylene glycol, 11.0 parts of ethanolamine and 420 parts of adipic acid at 240° C. and has an acid value of 2.0 and hydroxyl value of 57.3.

*Example 2*

25.2 parts by weight of an 80:20 mixture of 2.4 and 2:6-tolylene diisocyanate are added to a solution containing 200 parts of a polyesteramide, 0.8 part water, 0.2 part 4-dimethylaminopyridine and 370 parts of methylethylketone previously heated to 60° C. under a nitrogen atmosphere. The solution is then heated to a temperature between 79 to 80° C. and held at that temperature for 7–16 hours, when the viscosity of a sample diluted with 0.875 of its weight of methylethyl ketone has reached a minimum of 1.2 poise at 25° C. The solution is cooled to 60° C. and 3.5 parts of methanol are added. After stirring for a further 30 minutes 0.2 part of salicyclic acid dissolved in 3.5 parts of methylethylketone are added and the mixture is stirred until fully homogeneous.

The solution so obtained is suitable for the preparation of surface coatings as described in Example 3.

The polyesteramide used in this example is prepared by heating a mixture of 176 parts of ethylene glycol, 17.1 parts of diethylene glycol, 11.0 parts of ethanolamine and 420 parts of adipic acid at 240° C. and has an acid value of 2.0 and hydroxyl value of 57.3.

*Example 3*

9 parts of a 75% polyisocyanate solution in ethyl acetate, prepared by interacting an 80:20 mixture of 2:4- and 2:6-tolylenediisocyanates with a mixture of glycerol in ethyl acetate in amount so that there is 1 molar equivalent of diisocyanate for each hydroxyl group, are added to 100 parts of the solution prepared as described in Example 1. The mixture so obtained is spread on a nylon textile fabric and allowed to cure at room temperature for 3 days. A coating is obtained which has good adhesion and which is resistant to abrasion and dry-cleaning solvents.

A similar coating is obtained using the solution prepared as described in Example 2.

*Example 4*

25.2 parts of an 80:20 mixture of 2:4 and 2:6-tolylene diisocyanate are added to a solution containing 200 parts of a polyesteramide, 0.8 part of water, 0.2 part of 4-dimethylaminopyridine and 275 parts of methyl ethyl ketone previously heated to 60° C. under a nitrogen atmosphere. The solution is then held at 60° C. under a nitrogen atmosphere. The solution is then held at 60° C. for 7 to 16 hours, when the viscosity of a sample has reached a minimum of 20 poises at 25° C. as measured by the falling sphere method of test. When this level of viscosity is reached, 2.7 parts of ethylene glycol are added, and the solution stirred for 3 hours at 60° C. 0.15 part of salicylic acid are then added, and after stirring for a further hour at 60° C. the product is cooled and discharged.

The solution so obtained is suitable for the preparation of surface coatings as described in Example 3.

The polyesteramide used in this example is prepared by heating a mixture of 176 parts of ethylene glycol, 17.1 parts of diethylene glycol, 11.0 parts of ethanolamine and 420 parts of adipic acid at 240° C. and has an acid value of 3.3 and hydroxyl value 55.9.

*Example 5*

The procedure of Example 4 is repeated using 3.5 parts of propylene glycol in place of the 2.7 parts of ethylene glycol. A solution is obtained which is of similar utility to that prepared in Example 4.

*Example 6*

11.25 parts of a 75% polyisocyanate solution in ethyl acetate, prepared by interacting an 80:20 mixture of 2:4- and 2:6-tolylene diisocyanate with a mixture of glycerol and ethyl acetate in amount so that there is 1 molar equivalent of diisocyanate for each hydroxyl group, are added to 100 parts of the solution prepared as described in Example 5. The resulting mixture is spread as a thin film on a silicone coated paper using a conventional knife or roller and rubber type spreading machine with a gap between the knife and surface of the paper of 0.003 inch. Using a pressure roller at the end of the spreading machine this film is then transferred to a textile fabric which is then laminated to a 1/16 inch thick soft polyester urethane foam by means of a second pressure roller. The resulting laminate is then passed round a 2 foot diameter drum heated by steam at 100° C. After 3 days standing at room temperature the resulting laminate is fully cured and is resistant to washing and to the action of dry cleaning solvent such as perchloroethylene and white spirit.

*Example 7*

10 parts of an isocyanate composition are added to 100 parts of the adhesive solution prepared as described in Example 4. The resulting solution is diluted with 25 parts of methyl ethyl ketone. The mixture so obtained is useful as an adhesive for brush application for bonding polyurethane flexible and rigid foams to themselves and substrates such as cellulosic materials, including wood and cotton, synthetic materials such as nylon and terylene, and natural products such as leather.

The isocyanate composition used in this example is prepared by phosgenation of crude 4:4'-diamino-3-methyldiphenylmethane containing about 15% of polyamines obtained by condensing aniline, ortho-toluidine and formaldehyde in the molar proportions 3.3:1.1:1.0 in presence of hydrogen chloride.

What we claim is:

1. A process for the manufacture of a solution in an inert organic solvent of a polyurethane which comprises the steps of
   (1) interacting while dissolved in said solvent 1 molar proportion of a member selected from the group consisting of hydroxyl-terminated polyester and polyesteramide, between 1.2 and 2.5 molar proportions of an organic diisocyanate and between 0.25 and 1.0 molar proportions of water and, when the viscosity of the solution is between 1 and 1500 poises measured at 25° C.
   (2) adding an isocyanate-reactive compound selected from the group consisting of water and monofunctional and polyfunctional alcohols, phenols and primary and secondary amines in molar amount at least substantially equal to the molar amount of isocyanate groups unreacted at the end of step (1).

2. A process as claimed in claim 1 wherein the molar proportions of polyesteramide, diisocyanate and water are 1:1.3–1.6:0.3–0.6.

3. A process as claimed in claim 1 wherein the isocyanate-reactive compound is polyfunctional.

4. A process as claimed in claim 1 wherein not all the isocyanate-reactive groups have the same reactivity towards the isocyanate group.

5. A process as claimed in claim 1 wherein the amount of isocyanate-reactive compound is a molar amount for each molar amount of diisocyanate in excess of that required to react with the said member alone.

References Cited

UNITED STATES PATENTS

| | | | |
|---|---|---|---|
| 2,929,800 | 3/1960 | Hill | 260—77.5 |
| 2,968,575 | 1/1961 | Mallonee | 106—287 |
| 2,729,618 | 1/1956 | Muller et al. | 260—75 |
| 2,907,749 | 10/1959 | Greenlee | 260—47 |
| 3,100,721 | 8/1963 | Holden | 117—135.5 |
| 3,115,479 | 12/1963 | Windemuth et al. | 260—47 |
| 3,222,322 | 12/1965 | Nischk et al. | 260—75 |
| 3,001,973 | 9/1961 | Piepenbrink et al. | 260—75 |
| 3,007,899 | 11/1961 | Urs | 260—75 |
| 2,921,869 | 1/1960 | McBride | 117—138.8 |
| 3,061,470 | 10/1962 | Kuemmerer | 117—138.8 |
| 2,971,221 | 2/1961 | Schoenbeck | 264—178 |
| 3,036,878 | 5/1962 | Polansky | 264—178 |

FOREIGN PATENTS 538,977  4/1957  Canada.

JAMES A. SEIDLECK, *Primary Examiner.*

DONALD E. CZAJA, LEON J. BERCOVITZ,
*Examiners.*

J. J. KLOCKO, G. W. RAUCHFUSS,
H. S. COCKERAM, *Assistant Examiners.*